Jan. 22, 1924.
N. L. TOBIN
TIRE
Filed Jan. 22, 1923
1,481,488
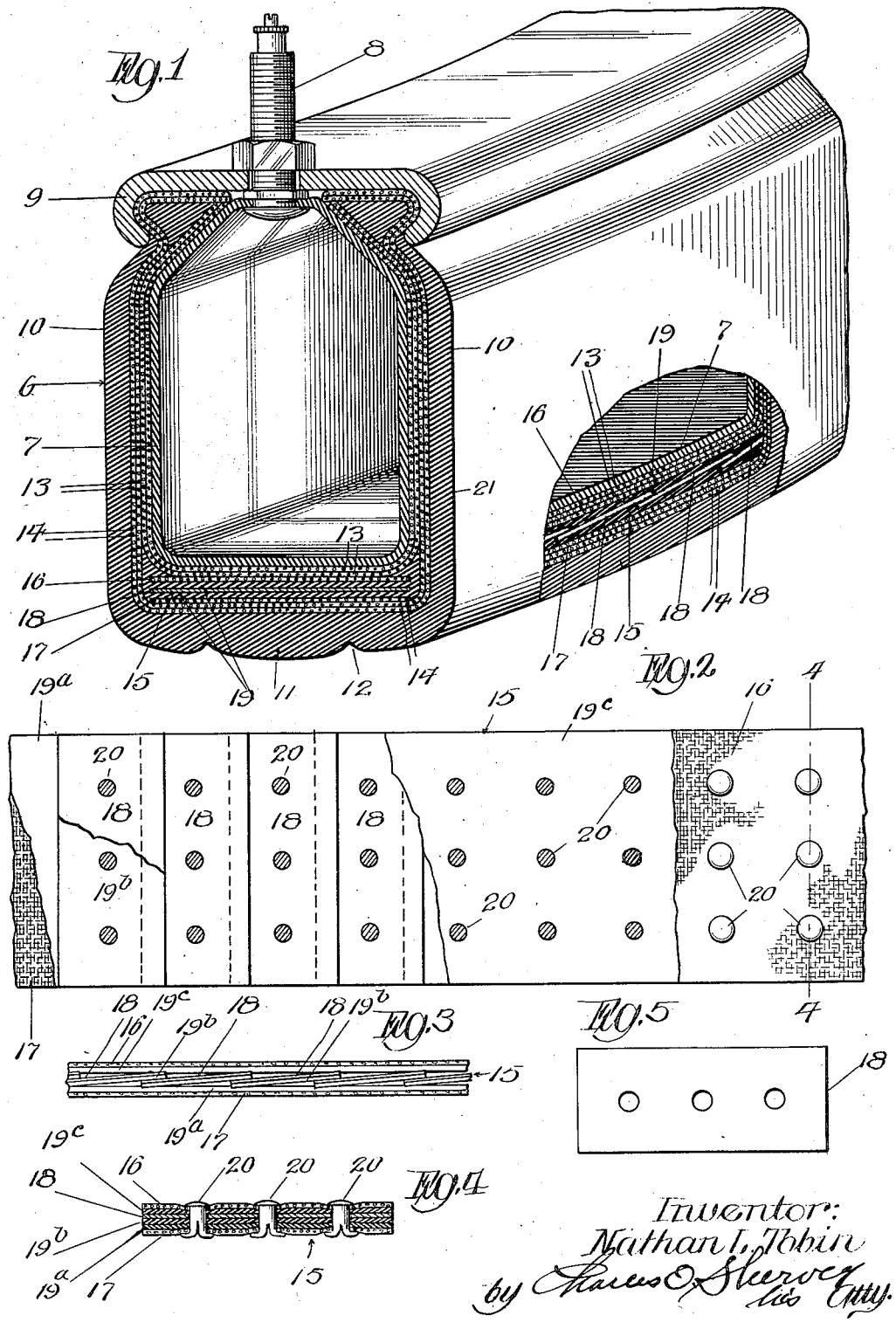
Inventor:
Nathan L. Tobin
by Charles O. Sherwell
his Atty.

Patented Jan. 22, 1924.

1,481,488

UNITED STATES PATENT OFFICE.

NATHAN L. TOBIN, OF CHICAGO, ILLINOIS.

TIRE.

Application filed January 22, 1923. Serial No. 614,129.

*To all whom it may concern:*

Be it known that I, NATHAN L. TOBIN, a subject of the present Government of Russia, and a resident of Chicago, Cook County, and State of Illinois, have invented certain new and useful Improvements in Tires, of which the following is declared to be a full, clear, and exact description.

This invention relates to tires, and its principal object is to provide a tire which shall be substantially proof against punctures by nails, tacks, glass or other sharp objects. Another object is to provide a tire casing having an armored or protecting medium embedded in the tread portion thereof, and composed of thin metal or other imperforable material which extends in straight lines across said tread portion from wall to wall. Another object is to provide an armor for protecting the inner tube against punctures from external objects, which armor is flexible and resilient, and does not interfere with the freedom of operation of the pneumatic tube. Another object is to provide a tire having an armored tread portion, embodying normally flat, overlapping metal strips which extend from wall to wall of the casing, and are secured together by fabric strips and an interposed rubber or elastic element, whereby the metal strips are prevented from working themselves around in the tire. Other objects and advantages will appear in the course of this specification, and with all of said objects and advantages in view, this invention consists in the several novel features of construction, arrangement and combination of parts hereinafter fully set forth and claimed.

The invention is clearly illustrated in the accompanying drawing, in which:

Fig. 1 is a perspective view of a fragment of a tire, embodying a simple form of the present invention, partly broken out to illustrate parts that would otherwise be hidden; Fig. 2 is a plan of a fragment of the armored band employed in the construction of the tire, certain portions being broken away to illustrate parts underneath the broken away portions; Fig. 3 is a side elevation of a fragment of said armored band after it has been assembled but before the parts have been riveted together; Fig. 4 is a cross section taken on the line 4—4 of Fig. 2 and Fig. 5 is a plan of one of the metal plates which is used in the construction of the armored band.

Referring to said drawing, the reference character 6 designates a fragment of a tire casing, embodying a simple form of the present invention; 7 designates the inner or pneumatic tube having the usual valve 8, and 9 designates a rim upon which the tire is secured, in accordance with any of the well known methods.

The tire casing is substantially channel shaped in cross section, the side walls 10 thereof being normally flat and parallel, and the tread portion 11, which connects said side walls, being normally straight across at all places on its inner face, but having an external tread face 12, of any design, as may be found desirable. The side walls and tread portions are reenforced by layers of tire fabric, or other suitable material, as shown at 13, 14 and between the layers 13 and 14, at the tread portion of the tire, is interposed the armored band 15 which extends from wall to wall of the casing and is vulcanized to and made an integral part of the tire casing.

The armored band 15 is made up of layers of tire fabric 16, 17, between which is an imperforable element, comprising, as shown herein, normally flat, overlapping, metal plates 18 that are embedded in and spaced away from the fabric strips 16, 17 by rubber or the like 19. Each plate overlies an adjacent one and underlies another adjacent one. The tire fabric strips 16, 17, metal plates 18, and rubber portions 19 are secured together by rivets or the like 20, whereby when the armored band is in use in the tire, the metal plates thereof may not work around or become displaced.

The armored band is made up in suitable lengths and in making up the band a strip of tire fabric 17, preferably "frictioned" on one or more faces, is first laid down and thereafter a rubber strip 19$^a$ (see Figs. 3 and 4) is laid upon the tire fabric, after which the metal plates 18 and rubber pieces 19$^b$ of the same size and shape as the metal plates, are laid upon the rubber strip 19$^a$ with the ends of the metal plates 18 and rubber pieces 19$^b$ overlapping, as is clearly shown in Fig. 3, and thereafter a second rubber strip 19$^c$, is laid upon the overlapping metal plates and the second strip of tire fabric 16 is placed upon the rubber strip 19$^c$. This tire fabric strip 16 may also be "frictioned" upon one or both of its faces, as is found desirable. The fabric strips, rubber and metal plates are thereupon riveted together by the rivets 20, to form a unitary structure, capable of being conveniently handled in building up a tire casing.

In forming the tire casing, the armored band is placed between the layers 13, 14 of the casing fabric at the tread portion, as is clearly seen in Fig. 1, and the whole is covered with the usual rubber exterior portion 21 and vulcanized to form one integral mass. The rubber strips 19ª, 19ᶜ and rubber pieces 19ᵇ become united during the vulcanizing process, as is clearly seen in Fig. 1, and the metal plates are consequently embedded in the rubber portion 19. The overlapping ends of the metal plates are spaced from each other by the interposed rubber, whereby the metal plates do not contact but are rendered capable of slight independent movement relative to each other; because of their fixed connection with the strips 16, 17 they are kept from displacement, and from working around in the body of the tire casing.

It should be observed that with the use of a tire casing of channel like cross section, having an inner bottom face, which extends in straight lines from side to side or wall to wall that an armored band may be employed, which uses normally straight metal plates extending from wall to wall of the tire casing. As a result, the vulnerable portions of the inner tube are protected against injury from sharp objects, thus providing a casing which is practically puncture proof.

More or less variation of the exact details of construction is possible without departing from the spirit of this invention; I desire, therefore, not to limit myself to the exact form of the construction shown and described, but intend, in the following claim, to point out all of the invention disclosed herein.

I claim as new and desire to secure by Letters Patent:

In a tire, a tire casing, comprising a generally channel shaped vulcanized body portion composed of layers of fabric and rubber, the bottom of the channel extending across in straight lines from wall to wall of the body portion, and an armored band contained in the tread portion of the casing between said layers of fabric, and having overlapping, flat, non-contacting metal plates embedded in rubber between fabric strips and riveted to said fabric strips to prevent any appreciable movement between said plates, said plates and fabric strips extending in straight lines across the tread portion from wall to wall, and each plate overlying an adjacent one and underlying another adjacent one.

NATHAN L. TOBIN.